United States Patent
Miotto et al.

(10) Patent No.: US 11,858,394 B2
(45) Date of Patent: Jan. 2, 2024

(54) CLOSE-OUT FOR ARMREST CAVITY

(71) Applicant: LEAR CORPORATION, Southfield, MI (US)

(72) Inventors: Ronald L. Miotto, Canton, MI (US); Alexandar Serafimovski, Dearborn Heights, MI (US); Carina Navarro, Taylor, MI (US); Thomas A. Welch, Sr., Ortonville, MI (US); Anne P. Aleksa, Livonia, MI (US); Mark Allyn Folkert, Farmington Hills, MI (US)

(73) Assignee: LEAR CORPORATION, Southfield, MI (US)

( * ) Notice: Subject to any disclaimer, the term of this patent is extended or adjusted under 35 U.S.C. 154(b) by 0 days.

(21) Appl. No.: 17/563,652

(22) Filed: Dec. 28, 2021

(65) Prior Publication Data
US 2023/0202367 A1 Jun. 29, 2023

(51) Int. Cl.
*B60N 2/75* (2018.01)
*B60N 2/68* (2006.01)
*B60N 2/58* (2006.01)

(52) U.S. Cl.
CPC .......... *B60N 2/757* (2018.02); *B60N 2/5825* (2013.01); *B60N 2/686* (2013.01)

(58) Field of Classification Search
CPC ....... B60N 2/757; B60N 2/5825; B60N 2/686
See application file for complete search history.

(56) References Cited

U.S. PATENT DOCUMENTS

| | | | | |
|---|---|---|---|---|
| 2,710,049 A | * | 6/1955 | Potocnik ............... | B60N 2/757 297/113 |
| 2,917,107 A | * | 12/1959 | Bloom .................. | B60N 2/757 297/113 |
| 3,666,319 A | * | 5/1972 | Moloney, Jr. ........ | B60N 2/0232 297/411.33 |
| 5,096,256 A | | 3/1992 | Mouri | |

(Continued)

FOREIGN PATENT DOCUMENTS

| FR | 2846920 B1 | 1/2005 |
|---|---|---|
| JP | 2013121792 A | 6/2013 |
| JP | 2015047387 A | 3/2015 |

OTHER PUBLICATIONS

German Office Action for DE 10 2022 130 702.6 dated Jul. 25, 2023 and English Translation, 16 pages.

*Primary Examiner* — David R Dunn
*Assistant Examiner* — Tania Abraham
(74) *Attorney, Agent, or Firm* — Brooks Kushman P.C.

(57) ABSTRACT

A seatback includes a trim cover/foam assembly including a foam cushion with a trim cover assembly disposed thereon. The trim cover/foam assembly has an occupant support side and a rear side opposite to the occupant support side, and defines an opening therethrough. The trim cover assembly includes a rear panel on the rear side for closing the opening. The seatback also includes an attachment member on the rear side of the trim cover/foam assembly configured to engage the rear panel and an armrest assembly including an armrest pivotally disposed on a frame at a rear portion of the armrest, with the armrest configured to pass through the opening. Upon installation of the armrest assembly, the rear panel is secured to the attachment member and sandwiched between the rear portion and the attachment member.

17 Claims, 3 Drawing Sheets

(56) References Cited

U.S. PATENT DOCUMENTS

| | | | | |
|---|---|---|---|---|
| 5,628,543 A | * | 5/1997 | Filipovich | B60R 5/006 297/188.14 |
| 10,358,068 B2 | * | 7/2019 | Okuma | B60N 2/757 |
| 2005/0260382 A1 | | 11/2005 | Schoemann et al. | |

* cited by examiner

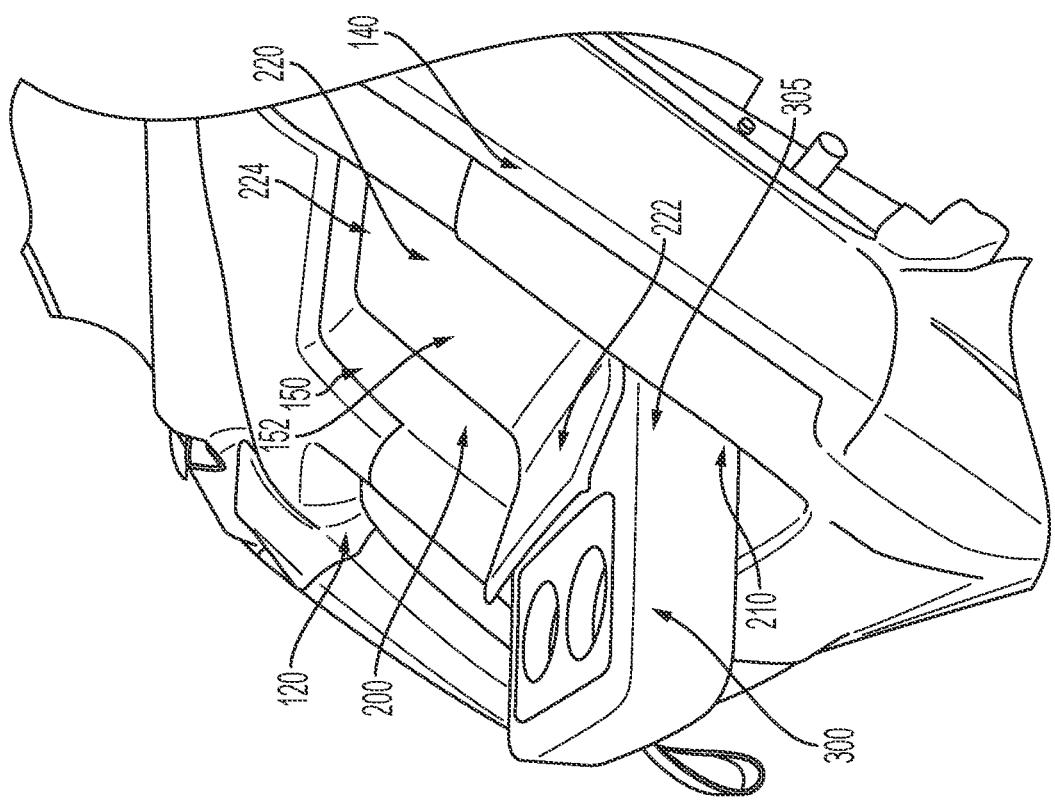
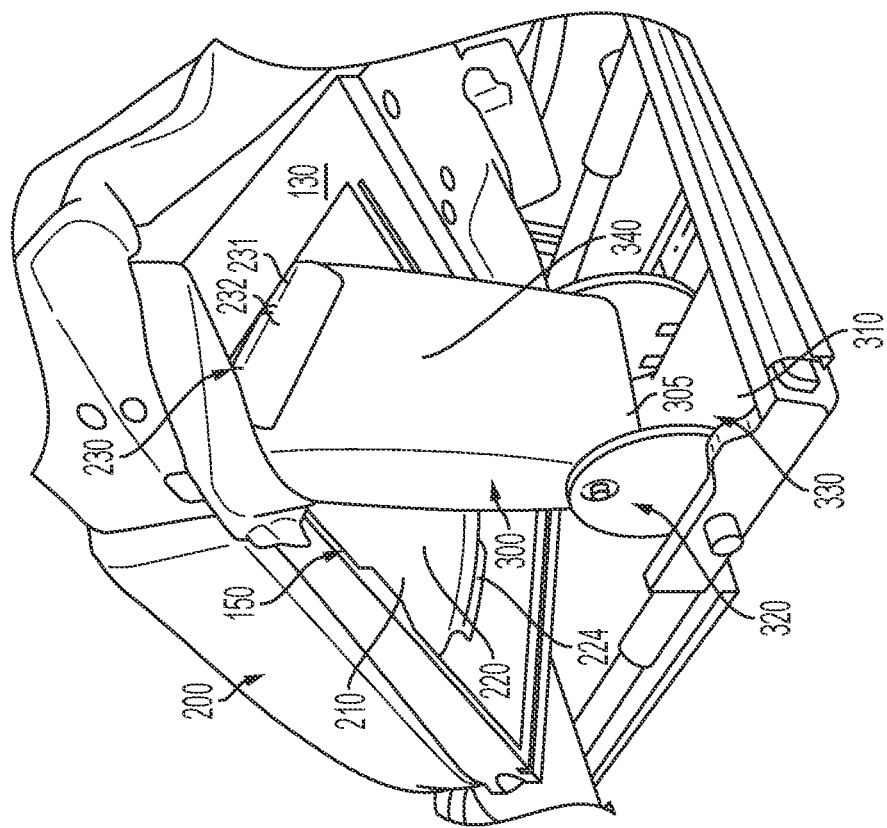
FIG. 3A
FIG. 3B

CLOSE-OUT FOR ARMREST CAVITY

TECHNICAL FIELD

The present application is directed to a trim cover for closing out a seat, and more particularly a seat assembly with a close-out for an armrest cavity.

BACKGROUND

Conventional seatbacks typically include a foam cushion with a trim cover disposed over the foam cushion. Conventional armrests are separately provided, and require complex constructions for closing-out the trim and securing the armrest to the seatback. Typically, the armrest is separately provided for mounting into a cavity in the trimmed seat. As such, the trim cover typically has visible attachments and mounting features for closing out the cavity in the seatback.

SUMMARY

According to one or more embodiments, a seatback includes a trim cover/foam assembly including a foam cushion with a trim cover assembly disposed thereon. The trim cover/foam assembly has an occupant support side and a rear side opposite to the occupant support side, and defines an opening therethrough. The trim cover assembly includes a rear panel on the rear side for closing the opening. The seatback also includes an attachment member on the rear side of the trim cover/foam assembly configured to engage the rear panel and an armrest assembly including an armrest pivotally disposed on a frame at a rear portion of the armrest, with the armrest configured to pass through the opening. Upon installation of the armrest assembly, the rear panel is secured to the attachment member and sandwiched between the rear portion and the attachment member.

According to one or more embodiments, a seat component includes a foam cushion defining an opening for receiving an armrest therethrough, and a trim cover assembly disposed on the foam cushion. The trim cover assembly has a rear panel on a rear side of the foam cushion. The seat component also includes an attachment member on the rear side of the foam cushion and positioned with a portion of the attachment member extending upward behind a bottom end of the opening. The attachment member is configured to be secured to the rear panel behind the armrest.

According to one or more embodiments, a method of constructing a seat includes covering a foam cushion with a trim cover assembly to form a trim cover/foam assembly defining an opening therethrough. The trim cover assembly includes a rear panel on a rear side of the trim cover/foam assembly with a free end for providing access to and closing the opening. The trim cover/foam assembly also includes an attachment member behind the opening on the rear side. The method further includes providing a frame having an armrest pivotally connected thereon, the armrest being sized to be passed through the opening, and passing the trim cover/foam assembly over the armrest to secure the trim cover/foam assembly to the frame. The method further includes securing the free end of the rear panel to the attachment member behind the armrest.

BRIEF DESCRIPTION OF THE DRAWINGS

FIGS. 3A-C show schematic illustrations of the close-out steps for a vehicle seat, according to an embodiment.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Moreover, except where otherwise expressly indicated, all numerical quantities in this description and in the claims are to be understood as modified by the word "about" in describing the broader scope of this invention. The term "substantially," "generally," or "about" may be used herein and may modify a value or relative characteristic disclosed or claimed. In such instances, "substantially," "generally," or "about" may signify that the value or relative characteristic it modifies is within ±0%, 0.1%, 0.5%, 1%, 2%, 3%, 4%, 5% or 10% of the value or relative characteristic. Practice within the numerical limits stated is generally preferred. Also, unless expressly stated to the contrary, the description of a group or class of materials by suitable or preferred for a given purpose in connection with the invention implies that mixtures of any two or more members of the group or class may be equally suitable or preferred.

According to embodiments of the present disclosure, a vehicle seat with a close-out for an armrest storage cavity upon installation of an armrest is provided. The vehicle seat includes a foam cushion having a trim cover thereon, hereinafter referred to as the trim cover/foam assembly, that forms the A-surface and seatback of the vehicle seat. The vehicle seat also includes an armrest disposed on a frame, configured to be passed through an opening in the trim/foam assembly. The trim/foam assembly has a rear panel that includes a flap corresponding to the opening. The A-side of the rear panel and the flap form the front facing surface of an armrest storage cavity defined in the trim cover/foam assembly. The trim cover/foam assembly includes an attachment member on the rear side of the trim cover/foam assembly that engages with the flap while the trim/foam assembly is supported on the frame after the armrest is passed through the opening. As such, the armrest cavity is closed out with the armrest installed via the trim cover/foam assembly without visible fixtures or attachments on the A-side of the vehicle seat.

Figure 1:
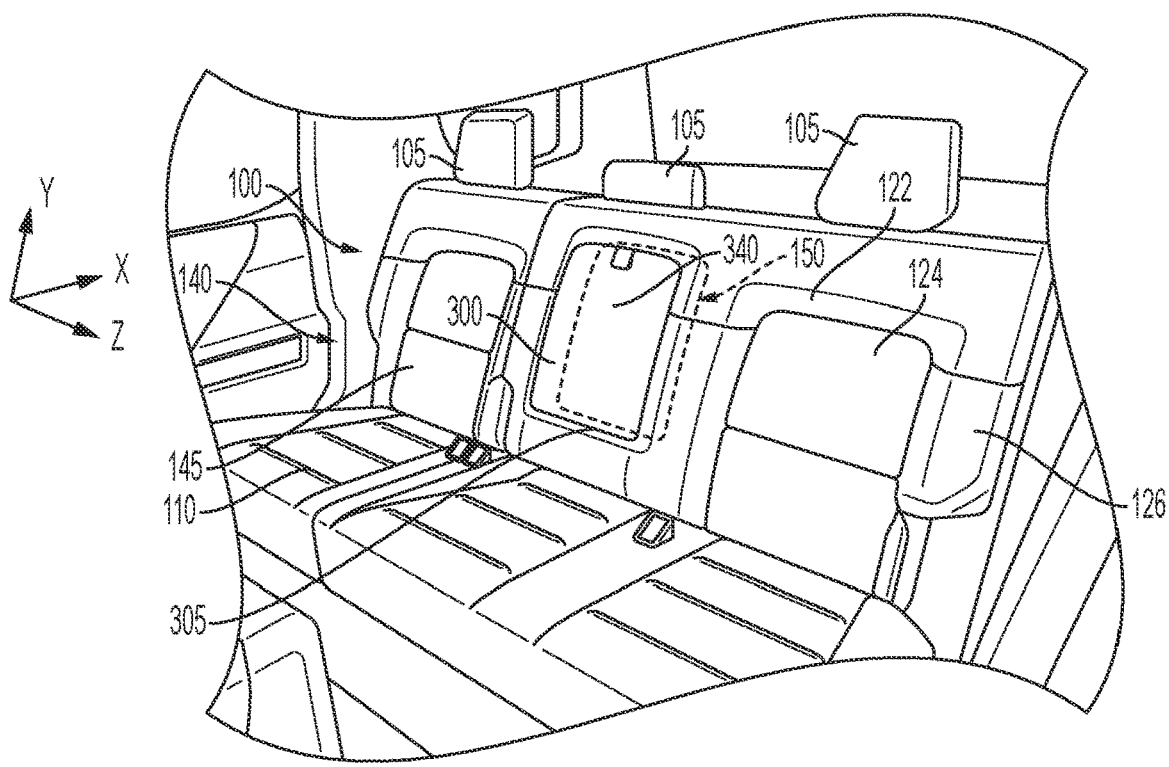
FIG. 1 illustrates a perspective schematic illustration of a representative vehicle seat assembly, according to an embodiment.

Referring to FIG. 1, an embodiment of a seat assembly 100 is shown. While the vehicle seat assembly 100 is illustrated in FIG. 1 to be a bench seat assembly, it should be understood that the principles of the present disclosure are applicable to other types of seat assemblies that include seats and an armrest that pivots between a stowed position, where the armrest is positioned in an armrest storage cavity 150 defined in the seatback A-surface, and a deployed position for use. Still further, it should also be understood that the principles of this disclosure are applicable to all types of vehicle seat assemblies as well as non-vehicle seat assemblies, and discussion of a vehicle seat is not intended to be limiting. The seat assembly 100 can be configured for use in a vehicle, such as motor vehicle like a car or truck, or for use in non-vehicular applications.

The seat assembly 100 includes a seat bottom 110 and a seatback 120 pivotally disposed on the seat bottom 110. The seat bottom 110 is mountable to a surface such as a vehicle floor. For example, the seat bottom 110 may be mounted on a seat frame (not shown) which can be removably secured to the vehicle floor. The seat assembly 100 is shown as a bench in FIG. 1, comprising individual seats, each having individual seat bottoms and seatbacks that collectively form the seat assembly 100. As such, reference to a seat bottom 110 and seatback 120 may refer to the seats collectively (i.e., the bench), or individually. The individual seatbacks 120 may be movable relative to other seatbacks of the seat assembly 100. For example, the seat assembly 100 may have a 60/40 split seatback construction, a 40/20/40 seatback construction, an evenly spaced seatback 3-seat construction, or other suitable construction of splitting the bench into individual seats as based on the desired aesthetic and function of the bench. In some embodiments, the seatback 120 may include a corresponding head restraint 105. Although FIG. 1 shows a vehicle seat assembly includes the head restraint 105, however, seat assembly designs may be constructed without the head restraint 105, or the head restraint 105 may be removable attached or pivotably attached based on design considerations of the vehicle interior, and each head restraint 105 may be constructed differently as based on the position on the seat assembly 100. Generally, the head restraint 105 is located at an upper end of the seatback 120, as defined along the axis Y over the height of the seatback 120, as shown in FIG. 1.

The seat bottom 110 and seatback 120 each include a foam cushion 130 (not visible in FIG. 1) having a trim cover assembly 140 disposed thereon (hereinafter, collectively referred to as trim cover/foam assembly 200). The foam cushions 130 can be conventionally secured to a seat frame (not shown) by any method generally known in the art. Each foam cushion 130 may be one or more foam parts, joined together to form the seating component. For example, the seatback 120 foam cushion may include side bolster portions, or any other components to meet a selected design. The trim cover assembly 140 is disposed on the foam cushion, and secured to the foam cushion 130 via any suitable attachment mechanism. The foam cushions can have any suitable size and configuration, based on the selected design for the vehicle seating arrangement, and particular the rear seats. The foam material of the cushions may be any suitable comfort foam material that provides soft resilience during use, such as, but not limited to, a suitable resilient polymer (e.g., polyurethane foam, soy-based foam, silicone, thermoplastic olefins, thermoplastic urethanes, polymer fibers, non-woven polyester pads, natural oil-based expanded polyurethanes, latex foams, and the like) and may be formed in any suitable manner.

The trim cover assembly 140 forms an exterior seating surface, also known as the A-surface, which can be an occupant support surface for the seat assembly 100. The trim cover assembly 140 includes a trim cover 145 that is made of at least one suitable material, such as, but not limited to, leather, synthetic leather, vinyl, fabric, synthetic suede, non-woven fabric, or combinations thereof (fabric-to-fabric, leather-to-leather, fabric-to-leather, leather-to-fabric, etc.). It should be understood that different portions of the seatback 120 and the seat bottom 110 may have a different trim cover portions forming the trim cover assembly 140 as based on the desired aesthetics for the seat assembly 100. Moreover, the trim cover assembly 140 can differ from the seat bottom 110 to the seatback 120, in addition to varying between the side bolsters and the upper regions. In at least one embodiment, as shown in FIG. 1, the trim cover assembly 140 comprises a plurality of trim cover panels that are secured together that form different regions of the seatback 120. For example, a top panel portion 122 and a central panel portion 124 are stitched, or otherwise secured, together, to the peripheral trim panels 126 (i.e., side bolsters) via stitching or seams. The trim cover assembly 140 on the inner side (i.e., B-surface, opposite to the A-surface), can have other conventional layers such as a thin foam layer (not shown) and various trim to secure the trim cover assembly 140 to the frame and/or foam cushions 130.

As shown in FIG. 1, the seat assembly 100 includes an armrest 300 pivotally disposed with respect to the seatback 120. The armrest 300 includes a cushion with a trim cover 340 disposed thereon, and may also include other features such as a cupholders, trash receptacles, or other features typically included in the armrests. The armrest 300 is pivotally attached relative to the seatback 120 such that it can be stored upright in a corresponding armrest storage cavity 150 (not shown in FIG. 1) in the seatback 120, and deployed to a use position by pivoting about the pivot point. The armrest 300 may pivot relative to a pivot point (not shown) towards the bottom of the seatback 120 (along the axis Y defined along the seatback), such that when pivoted forward (e.g., away from the front surface (A-surface) of the seatback 120, as defined along the axis X shown in FIG. 1) the armrest 300 is positioned above the seat bottom 110 and extending away from the seatback 120 in the deployed position. The armrest 300 is mounted to a frame 310 (see FIG. 3A) to form an armrest assembly, on which the trim cover/foam assembly 200 is to be positioned thereon, as will be discussed with reference to the Figures, with the trim cover/foam assembly 200 having features to close-out the seatback and form the front facing surface 152 of the armrest storage cavity 150.

With reference to FIG. 2, FIGS. 3A-C, and FIG. 4, various features of the seat assembly 100 is shown.

Figure 2:
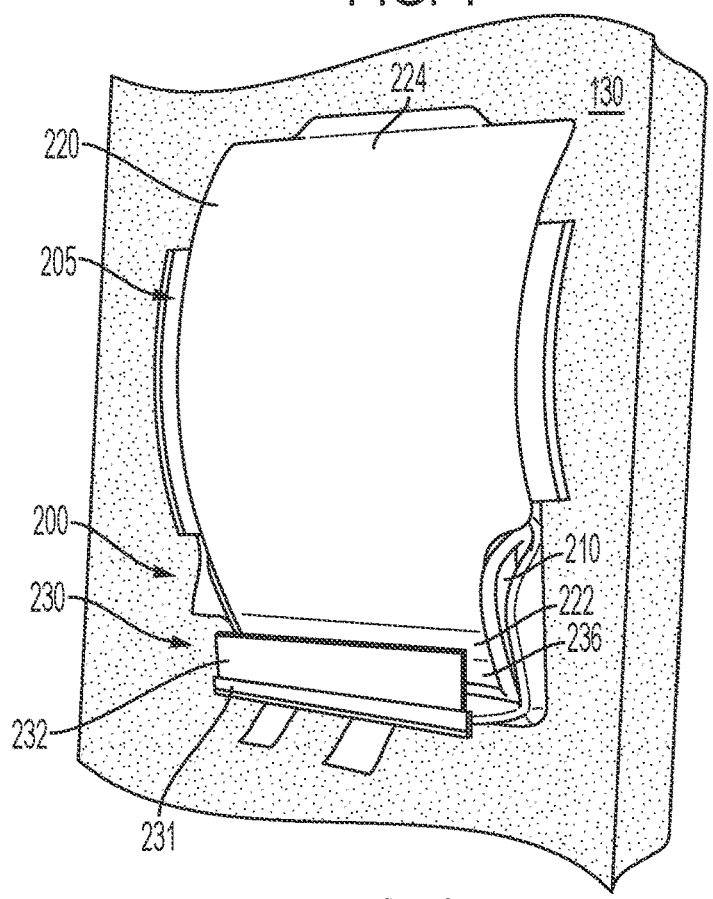
FIG. 2 is a rear perspective view of a portion of trim/foam assembly of a vehicle seat, according to an embodiment.

Referring to FIG. 2, the seat assembly 100 includes a trim cover/foam assembly 200 which is a seat component for forming the seatback 120. The trim cover/foam assembly 200 includes a close-out for the armrest storage cavity 150 after installation of an armrest 300. The trim cover/foam assembly 200 is positioned on the armrest 300 during installation to form the seatback 120. The trim cover/foam assembly 200 includes the trim cover assembly 140 mounted on the foam cushion 130, which cooperates to form an occupant support surface for the seatback 120. The trim cover/foam assembly 200 thus has an occupant support side on a front surface of the trim cover/foam assembly 200, and a rear side opposite to the occupant support side. On the rear side, the trim cover assembly 140 including a rear panel 205 for closing out the armrest storage cavity 150 upon installation of the armrest 300 to form the seatback 120. The rear panel 205 of the trim cover/foam assembly 200 corresponds to an opening 210 defined in the trim cover/foam assembly 200 of the seatback 120, and provides access through the opening 210 for the armrest 300 to be fed therethrough and closes the opening 210 upon installation of the armrest 300. The opening 210 is sized to receive the armrest 300 therethrough. The opening 210 is sized to correspond to the armrest 300 such that the trim cover/foam assembly 200 can be fed over the armrest 300. The rear panel 205 includes a flap 220 for covering the opening 210 with a free end 222 towards the bottom of the flap 220 (corresponding to the bottom end of the opening 210), and a fixed end 224 towards the top of the seatback 120 (corresponding to a top end of the opening 210). The flap 220 may be any suitable trim material, including, but not limited to, leather, vinyl, fabric, etc. The free end 222 is hemmed such that at least the bottom of the flap 220 (corresponding to a bottom end of the opening 210) encloses a stiffening member (not shown) within the flap 220 for providing rigidity and structure to the flap 220 to form the front facing surface 152 of the armrest storage cavity 150. The stiffening member is formed of any suitable material, such as, but not limited to, a polypropylene material, which provides sufficient rigidity to form the front facing surface 152 of the armrest storage cavity 150 while providing flexibility to the flap 220 such that the armrest 300 can pass through the opening 210 and the flap 220 can be secured to the trim cover/foam assembly 200. The stiffening member may have any suitable dimensions as based on the size of the flap 220, and/or the armrest storage cavity 150 to close-out the armrest storage cavity 150 upon installation of the armrest 300. Furthermore, the stiffening member may have any suitable thickness as based on the flexing requirement of the flap 220 and for forming the front facing surface 152 of the armrest storage cavity 150 after installation of the armrest 300. For example, the stiffener may have, in some embodiments, a thickness of 0.5 to 10 mm, in other embodiments, 0.75 to 7.5 mm, and in yet further embodiments, 1 to 5 mm. As such, the A-side of flap 220 of the rear panel 205 forms the front facing surface 152 of the armrest storage cavity 150 in the seatback 120 to close-out the seat assembly 100.

Referring to FIG. 3A, the armrest 300 is hinged to a frame 310 to form the armrest assembly. The armrest 300 is hinged via mounting plates 320, with the frame 310 being connected to a metal tray 330. The mounting plates 320 are configured to provide pivot points for the armrest 300 to pivot relative to the seatback 120 to an open position and a stored position in the armrest storage cavity 150, with the plates 320 hidden between the trim cover/foam assembly 200 and the armrest 300. The metal tray 330 forms a back surface of the seatback 120 upon construction of the seat assembly 100 (i.e., positioning of and securing the trim cover/foam assembly 200 on the metal tray 330). The metal tray 330 is configured to receive a carpeting or other trim material thereon to form the aesthetic rear surface of the seatback 120.

Referring again to FIG. 2 and to FIGS. 3A-B, the trim cover/foam assembly 200 further includes an attachment member 230 on the rear side of the trim cover/foam assembly 200 (hereinafter, interchangeably the lower facing attachment member 230) for engaging the rear panel 205 (e.g., via engaging fasteners on the corresponding parts). The attachment member 230 is positioned behind the rear panel 205 and attached to the trim cover/foam assembly 200, behind the area defined as the armrest storage cavity 150. The attachment member 230 is a sufficiently rigid member that acts as a stiffener and/or support for features secured thereon. The attachment member 230 includes an upward protruding body 232 connected to the trim cover/foam assembly 200. The upward protruding body 232 may be connected to the trim cover/foam assembly 200 in any suitable manner, such as, for example, via a listing 231 as shown in the Figures, selvage, or other suitable connection mechanism. The listing 231 and the trim cover/foam assembly 200 may be attached by any suitable means, such as, but not limited to, sewing or stitching, or other mechanical fastener or adhesive, with the upward protruding body 232 positioned therebetween such that the upward protruding body 232 has a height over at least a portion of the upward protruding body 232 that overlaps at least a portion of the free end 222 of the flap 220. As such, the front facing side of the upward protruding body 232 is configured to contact the free end 222 of the flap 220 to close-out the armrest storage cavity 150.

The attachment member 230 is secured to the rear facing side of the trim cover/foam assembly 200 towards at a lower end of the seatback 120. The upward protruding body 232 extends generally upward, toward the top of the seatback 120, and is formed of any suitable stiffening material, such as, but not limited to, a polypropylene material, which provides sufficient rigidity to materials secured thereto and stand upward without application of additional forces. The upward protruding body 232 may have any suitable dimensions as based on the size of the opening 210, the flap 220, and/or the free end 222 to close-out the rear panel 205 to form the front facing surface 152 of the armrest storage cavity 150 after installation of the armrest 300. The height of the upward protruding body 232 may, in some embodiments, be sufficient to allow the armrest 300 to pass through the opening without significant obstruction, and also be sufficient to provide an overlapping height for contacting the free end 222. Furthermore, the upward protruding body 232 may have any suitable thickness in order to secure the free end 222 to the trim cover/foam assembly 200 and maintain the closed-out trim after installation of the armrest 300. For example, the upward protruding body 232 may have, in some embodiments, a thickness of 0.5 to 10 mm, in other embodiments, 0.75 to 7.5 mm, and in yet further embodiments, 1 to 5 mm.

Figure 4:
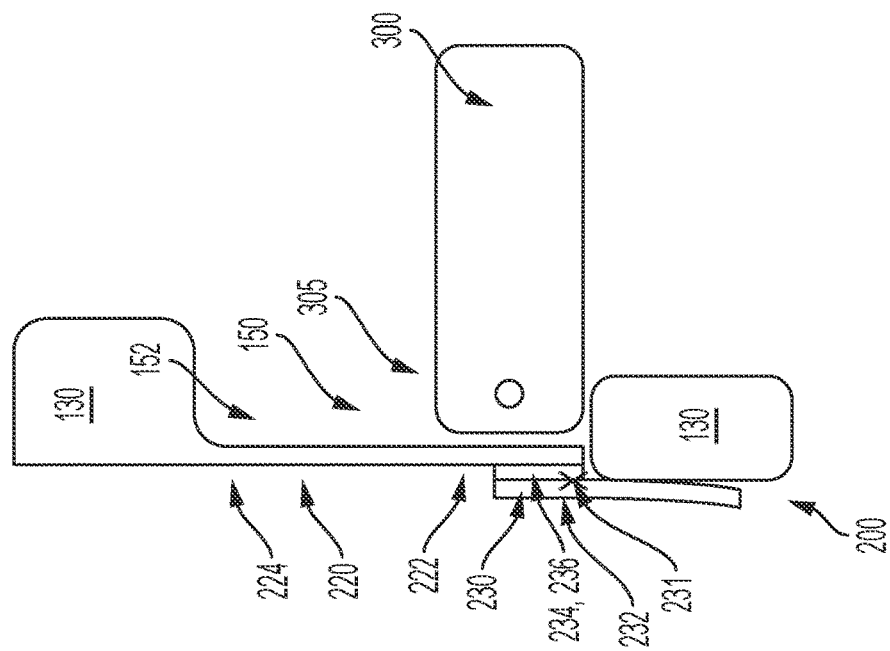
FIG. 4 is a cross-section view of a closed-out vehicle seat, according to an embodiment.
Figure 3C:
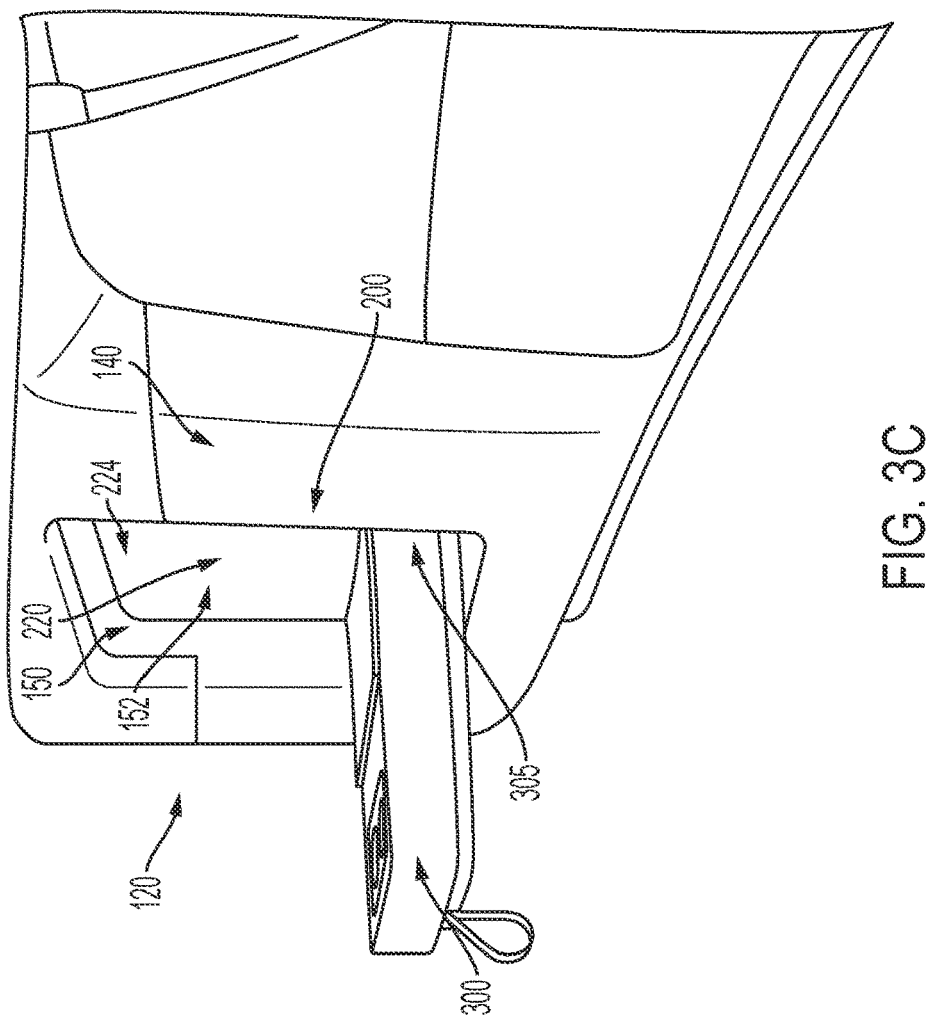

With reference to FIG. 3B-C, after the trim cover/foam assembly 200 is passed over the armrest 300 via the opening 210 in the rear panel 205, the free end 222 of the flap 220 is pushed behind a rear portion 305 of the armrest 300. Upon the positioning of the free end 222 behind the rear portion 305 of the armrest 300, the free end 222 engages the lower facing attachment member 230 behind the armrest 300, such that the free end 222 is sandwiched between the upward protruding body 232 of the lower facing attachment member 230 and the rear portion 305 of the armrest 300, as is shown in FIG. 4. The free end 222 of the flap 220 and the lower facing attachment member 230 are secured together via engagement of the fasteners 226, 234 behind the rear portion 305 to close out the seat assembly 100 after installation of the armrest 300. Although not explicitly described herein, the installation of the armrest 300 may include other securing mechanisms for the frame 310 with the trim cover/foam assembly 200 to form the seat assembly 100, and discussion of the trim close-out for armrest storage cavity 150 for the armrest 300 is not intended to limit other connections and fasteners to construct the seat assembly 100. As such, for example, as shown in the Figures, the free end 222 may include a fastener on the rear side of the flap 220 (i.e., a flap fastener) for engaging the fastener 234 on the front side of the attachment member 230.

With reference to FIG. 4, the engagement of the attachment member 230 and the free end 222 of the flap 220 to close-out the rear panel 205 to form the front facing surface 152 of the armrest storage cavity 150 upon installation of the armrest 300 is shown, schematically. As such, the upward protruding body 232 thus may include a fastener 234 on the front facing side, which engages a fastener 226 on the rear facing side of the free end 222 of the flap 220 (shown schematically in FIG. 4). In certain embodiments, the fasteners may be corresponding hook and loop fasteners, however, any suitable fasteners are contemplated, and discussion of hook and loop fasteners is not intended to be limiting. The attachment member 230 and the rear portion 305 of the armrest 300 sandwich the flap 220 therebetween, with the attachment member 230 being fastened with the free end 222 such that the rear panel 205 defines the front facing surface 152 of the armrest storage cavity 150.

According to one or more embodiments, a method of constructing a seat assembly is provided. The method generally includes installing the armrest 300 through the trim cover/foam assembly 200. The armrest 300, which is provided on a frame 310 on metal tray 330 and hinged to the frame 310 via mounting plates 320, is aligned with the trim cover/foam assembly 200 such that the opening 210 in the rear panel 205 is aligned with the armrest 300. The armrest 300 is fed through the opening 210 such that the free end 222 of the flap 220 is movable to rest on a top surface of the armrest 300 (see FIG. 3B). The free end 222 of the flap 220 and the upward protruding body 232 of the lower facing attachment member 230 are then pressed behind the rear portion 305 of the armrest 300 (see FIG. 3C) such that the free end 222 is sandwiched between the rear portion 305 of the armrest 300 and the lower facing attachment member 230 such that the upward protruding body 232 of the lower facing attachment member 230 and the fastener 226 on the free end 222 of the flap 220 can be secured with the fastener 234 on the inner side of the upward protruding body 232.

According to embodiments of the present disclosure, a vehicle seat with a close-out for installation of an armrest is provided. The vehicle seat includes trim cover/foam assembly that cooperate to form the A-surface and seatback of the vehicle seat. The vehicle seat also includes an armrest disposed on a frame, the armrest being pivotable between a storage position in a cavity formed in the seatback and a deployed position for use. The trim cover/foam assembly defines an opening for receiving the armrest therethrough. The trim/foam assembly has a rear panel with a flap corresponding to the opening. The trim cover/foam assembly includes a lower facing attachment member on the rear side of the trim/foam assembly, towards the bottom of the opening, that engages with the flap while the trim/foam assembly is supported on the frame and the armrest is passed through the opening. As such, the armrest is closed out via the trim/foam assembly without visible fixtures or attachments on the A-side of the vehicle seat.

As with reference to the Figures, the same reference numerals may be used herein to refer to the same parameters and components or their similar modifications and alternatives. For purposes of description herein, the directional terms "upper," "lower," "right," "left," "rear," "front," "vertical," "horizontal," and derivatives thereof shall relate to the present disclosure as oriented in FIGS. 1 and 4. However, it is to be understood that the present disclosure may assume various alternative orientations, except where expressly specified to the contrary. It is also to be understood that the specific devices and processes illustrated in the drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. The drawings referenced herein are schematic and associated views thereof are not necessarily drawn to scale.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A seatback comprising:
   a trim cover/foam assembly including a foam cushion with a trim cover assembly disposed thereon, the trim cover/foam assembly having an occupant support side and a rear side opposite to the occupant support side, and the foam cushion defining an opening therethrough, the trim cover assembly having a rear panel on the rear side for closing the opening, the rear panel including a flap with a fixed end toward a top end of the opening, and a free end toward a bottom end of the opening;
   an attachment member on the rear side of the trim cover/foam assembly configured to engage the rear panel; and
   an armrest assembly including an armrest pivotally disposed on a frame at a rear portion of the armrest, the armrest configured to pass through the opening,
   wherein, upon installation of the armrest assembly, the rear panel is secured to the attachment member and sandwiched between the rear portion and the attachment member.

2. The seatback of claim 1, wherein the free end engages the attachment member behind the rear portion of the armrest.

3. The seatback of claim 1, wherein the free end includes a fastener on a rear surface of the free end for engaging a fastener on the attachment member.

4. The seatback of claim 1, wherein the attachment member includes an upward protruding body behind the opening, the upward protruding body having a fastener on a front side for engagement with the rear panel.

5. The seatback of claim 1, wherein the occupant support side defines an armrest storage cavity therein when the rear panel closes the opening on the rear side of the foam cushion.

6. The seatback of claim 5, wherein a front side of the rear panel forms a front surface of the armrest storage cavity.

7. The seatback of claim 1, wherein the rear panel includes a stiffening member within the rear panel, the stiffening member being a polypropylene material.

8. The seatback of claim 1, wherein the attachment member is a polypropylene material.

9. A seat component comprising:
   a foam cushion defining an opening for receiving an armrest therethrough;
   a trim cover assembly disposed on the foam cushion, the trim cover assembly having a rear panel on a rear side of the foam cushion, the rear panel including a flap sized to close the opening, the flap having a fixed end toward a top end of the opening and a free end toward a bottom end of the opening such that the flap allows the armrest to pass through the opening; and
   an attachment member on the rear side of the foam cushion and positioned with a portion of the attachment member extending upward behind a bottom end of the opening,
   wherein the attachment member is configured to be secured to the rear panel behind the armrest.

10. The seat component of claim 9, wherein the attachment member includes a fastener thereon for engaging with the free end of the flap.

11. The seat component of claim 10, wherein the fastener is on a front facing side of the attachment member, and the free end includes a flap fastener on a rear facing side of the fastener which cooperate to close out the trim cover assembly.

12. The seat component of claim 9, wherein the attachment member is connected to the rear side below the opening and extends upward such that a height of the attachment member is positioned behind the bottom end of the opening corresponding to the free end of the flap.

13. The seat component of claim 9, wherein the attachment member includes an upward protruding member behind the opening, and the upward protruding member is a polypropylene material.

14. The seat component of claim 9, wherein the rear panel includes a stiffening member within the rear panel, the stiffening member being a polypropylene material.

15. A method of constructing a seat, comprising:
covering a foam cushion with a trim cover assembly to form a trim cover/foam assembly, the foam cushion defining an opening therethrough, with the trim cover assembly including a rear panel on a rear side of the trim cover/foam assembly with a free end located towards a bottom of the opening for providing access to and closing the opening, and an attachment member behind the opening on the rear side;
providing a frame having an armrest pivotally connected thereon, the armrest being sized to be passed through the opening;
passing the trim cover/foam assembly over the armrest to secure the trim cover/foam assembly to the frame; and
securing the free end of the rear panel to the attachment member behind the armrest such that the attachment member is connected to the trim cover/foam assembly to close the opening.

16. The method of claim 15, wherein the attachment member extends upward behind the opening such that a height of the attachment member overlaps the free end.

17. The method of claim 15, wherein the attachment member and free end include corresponding fasteners to secure the free end and the attachment member behind the armrest.

* * * * *